(12) United States Patent
McConnell

(10) Patent No.: US 9,834,180 B2
(45) Date of Patent: Dec. 5, 2017

(54) METHOD AND APPARATUS FOR PREVENTING A BUILD UP OF SNOW OR DUST

(71) Applicant: Craig McConnell, Edmonton (CA)

(72) Inventor: Craig McConnell, Edmonton (CA)

(*) Notice: Subject to any disclaimer, the term of this patent is extended or adjusted under 35 U.S.C. 154(b) by 0 days.

(21) Appl. No.: 13/954,172

(22) Filed: Jul. 30, 2013

(65) Prior Publication Data

US 2013/0313334 A1    Nov. 28, 2013

Related U.S. Application Data

(62) Division of application No. 12/843,332, filed on Jul. 26, 2010, now abandoned.

(30) Foreign Application Priority Data

Jul. 28, 2009 (CA) ...................... 2672388

(51) Int. Cl.
*B60S 1/54* (2006.01)
*B60S 1/60* (2006.01)

(52) U.S. Cl.
CPC .. *B60S 1/54* (2013.01); *B60S 1/60* (2013.01)

(58) Field of Classification Search
CPC ..................................... B60S 1/60; B60S 1/54
USPC ........... 134/34, 37, 123; 15/300.1, 301, 313, 15/316.1, 322
See application file for complete search history.

(56) References Cited

U.S. PATENT DOCUMENTS

| | | |
|---|---|---|
| 3,052,031 A | 9/1962 | Piscitelli |
| 3,469,088 A | 9/1969 | Coleman et al. |
| 3,915,385 A | 10/1975 | Hassinger |
| 3,969,824 A | 7/1976 | Widen et al. |
| 4,037,079 A | 7/1977 | Armbruster |
| 4,285,470 A * | 8/1981 | Roth ..................... 239/284.2 |
| 4,505,001 A | 3/1985 | Fasolino |
| 4,531,255 A | 7/1985 | Yagasaki et al. |
| 4,752,032 A | 6/1988 | Costa et al. |
| 4,928,580 A | 5/1990 | McIntyre et al. |
| 4,955,543 A | 9/1990 | Orth et al. |
| 5,083,339 A | 1/1992 | Bristow |
| 5,096,287 A * | 3/1992 | Kakinami ............ B60R 1/12 352/131 |
| 5,097,563 A | 3/1992 | Cowan |
| 5,140,719 A | 8/1992 | Cowan |
| 5,419,005 A | 5/1995 | Mori |

(Continued)

FOREIGN PATENT DOCUMENTS

| | | |
|---|---|---|
| CA | 2187603 | 4/1998 |
| JP | 6016157 A1 | 1/1994 |

(Continued)

*Primary Examiner* — Alexander Markoff
(74) *Attorney, Agent, or Firm* — Davis & Bujold PLLC; Michael J. Bujold

(57) ABSTRACT

An apparatus for preventing a build up of snow or dust. The apparatus includes a plurality of air nozzles positioned around a periphery of a target area to be kept clear of snow or dust. Each of the nozzles directs a stream of air away from the target area. A deflector is positioned around a periphery of the target area. The deflector deflects the stream of air from each nozzle across the target area, wherein an air curtain is formed preventing snow or dust from landing on the target area.

7 Claims, 2 Drawing Sheets

(56) References Cited

U.S. PATENT DOCUMENTS

| | | | |
|---|---|---|---|
| 5,486,139 A * | 1/1996 | Papp | B60S 1/54 |
| | | | 15/313 |
| 5,546,630 A | 8/1996 | Long | |
| 5,617,608 A | 4/1997 | Primlani | |
| 5,657,929 A | 8/1997 | DeWitt et al. | |
| 5,852,846 A | 12/1998 | Gonzalez | |
| 6,071,000 A * | 6/2000 | Rapp | F21S 48/335 |
| | | | 362/362 |
| 6,249,931 B1 | 6/2001 | Sato | |
| 6,739,521 B2 | 5/2004 | Bandemer et al. | |
| 2003/0155001 A1* | 8/2003 | Hoetzer | B60S 1/0822 |
| | | | 134/37 |
| 2006/0097111 A1* | 5/2006 | Wood | B64C 1/1476 |
| | | | 244/134 C |
| 2009/0001001 A1* | 1/2009 | Martin | 210/130 |
| 2009/0017743 A1 | 1/2009 | Raghuprasad | |
| 2012/0266922 A1* | 10/2012 | Krahn et al. | 134/123 |

FOREIGN PATENT DOCUMENTS

| | | | | |
|---|---|---|---|---|
| JP | 2004182080 A * | 7/2004 | | |
| JP | 2009120137 A * | 6/2009 | | B60Q 1/0491 |

* cited by examiner

US 9,834,180 B2

1

METHOD AND APPARATUS FOR PREVENTING A BUILD UP OF SNOW OR DUST

FIELD

The method and apparatus described are intended to prevent a layer of snow or dust from obscuring surfaces, such as vehicle tail lights or road side signs.

BACKGROUND

There have been a number of apparatus developed for the purpose of removing a layer of snow or dust from vehicle tail lights or head lights. Examples of such apparatus include U.S. Pat. No. 3,915,385 (Hassinger) with an invention entitled "Vehicle headlamp washing system" and U.S. Pat. No. 5,546,630 (Long) with an invention entitled "Blast wiper for motor vehicle lights".

These apparatus teach how to remove snow or dust after it has accumulated on the motor vehicle lights. The apparatus are incapable of proactively preventing such an accumulation of snow or dust from occurring.

SUMMARY

According to one aspect there is provided an apparatus for preventing a build up of snow or dust. The apparatus includes a plurality of air nozzles positioned around a periphery of a target area to be kept clear of snow or dust. Each of the nozzles directs a stream of air away from the target area. A deflector is positioned around a periphery of the target area. The deflector deflects the stream of air from each nozzle across the target area, wherein an air curtain is formed preventing snow or dust from landing on the target area.

According to another aspect there is provided a method for preventing a build up of snow or dust. The method includes directing stream of air from a plurality of air nozzles across a target area on a surface to form an air curtain which prevents snow and dust from landing on the target area.

In the description which follows, the method and apparatus will be illustrated and described with reference to a tail light on a vehicle. It must be noted that the same principles apply to headlights, running lights, or any other kind of lights. However, the teachings are not restricted to lights. There is no reason why the target area could not be a logo on a vehicle, a license plate, or any other portion of the vehicle that one may wish to keep clear of snow or dust. It will also be apparent that the same principles could be used to keep road side signs and other surfaces clear of snow or dust.

Where the target area is a light, it is preferred that the deflector be transparent in order to prevent the deflector from obscuring the visibility of the light.

BRIEF DESCRIPTION OF THE DRAWINGS

These and other features will become more apparent from the following description in which reference is made to the appended drawings, the drawings are for the purpose of illustration only and are not intended to be in any way limiting, wherein.

2

Figure 1:
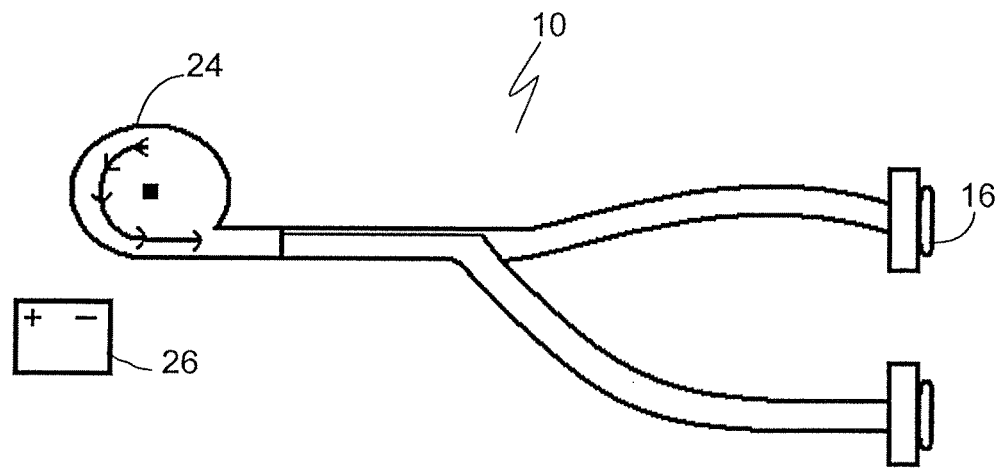
FIG. 1 is a side elevation view of an apparatus being used to prevent snow or dust from obscuring a tail light.
Figure 2:
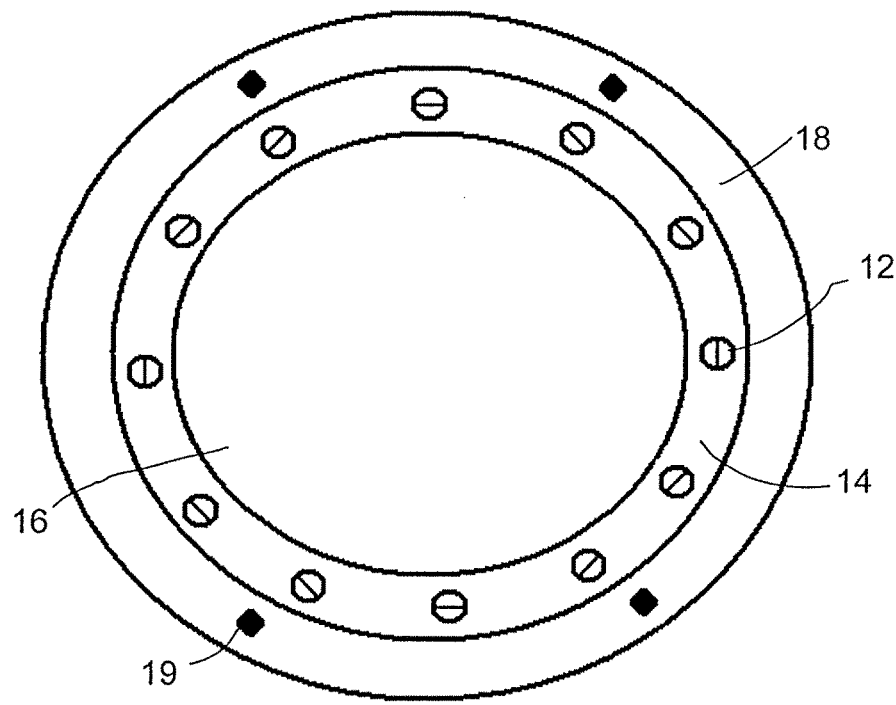

FIG. 2 is a front elevation view of the tail light illustrated in FIG. 1.

Figure 3:
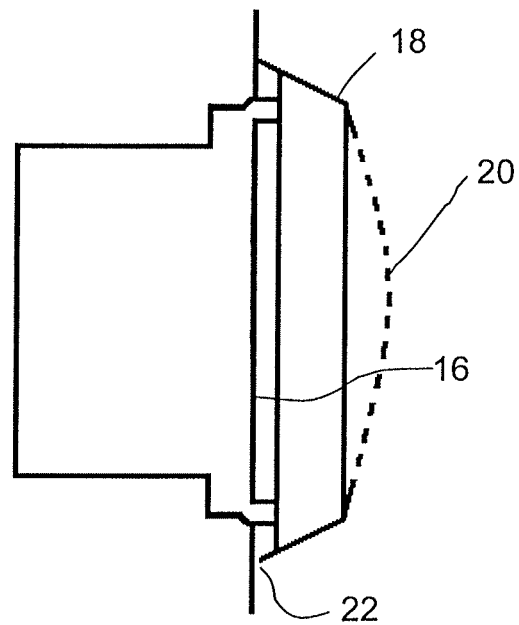

FIG. 3 is a side elevation view, in section, of the tail light illustrated in FIG. 2.

Figure 4:
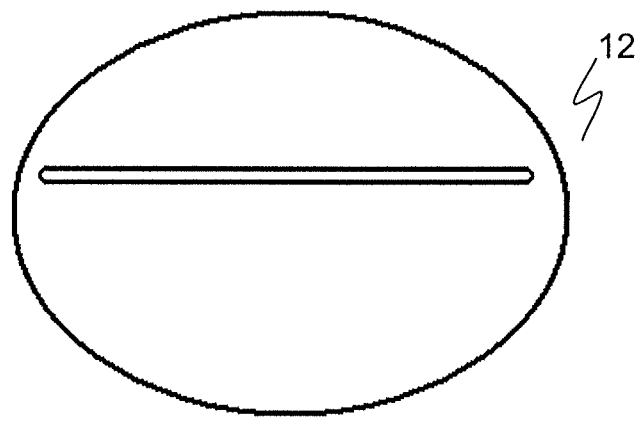

FIG. 4 is a front elevation view of a duck bill nozzle used in the tail light illustrated in FIG. 3.

DETAILED DESCRIPTION

An apparatus for preventing a build up of snow or dust generally identified by reference numeral 10, will now be described with reference to FIG. 1 through 3. The apparatus will be described with reference to lights on a vehicle. This is for purposes of illustration only. The example selected could have been a logo on a vehicle, a road side sign or another analogous application.

Structure and Relationship of Parts:

Referring to FIG. 2, an apparatus 10 for preventing a build up of snow or dust includes a plurality of air nozzles 12 positioned around a periphery 14 of a target area, such as a light 16, on a vehicle to be kept clear of snow or dust. Referring to FIG. 4, the air nozzles 12 are preferably duck bill nozzles. Duck bill nozzles are commercially available at relatively low cost. The "duck bill" of the nozzle opens under air pressure, but closes tightly without air pressure. Referring to FIG. 2, each of the nozzles 12 directs a stream of air away from the light 16.

A deflector 18 is positioned around the periphery 14 of the light 16 and held in place by mounting screws 19. The mounting screws 19 used to hold the deflector 18 in place, can be the same mounting screws that are used to hold light 16 in place. Referring to FIG. 3, the deflector 18 deflects the stream of air from each nozzle 12 across the target area (light 16) to create an air curtain 20 that prevents snow or dust from landing on the light 16. The deflector 18 is transparent in order to prevent the deflector 18 from obscuring visibility of the light 16. Drainage holes 22 on the deflector 18 allows for the draining of condensation, melted snow on deflector and any other liquids away from the light 16.

Referring to FIG. 1, an air source 24 provides air to the air nozzles 12. It is preferred that the air source 24 be independent of any air system used to operate other vehicle systems. The air source 24 has its own battery 26, so that it is capable of continuing to function when the vehicle is parked and not running.

Operation:

Referring to FIG. 1, power is supplied to air source 24 from battery 26. Air is supplied from the air source 24 to the air nozzles 12, preferably, duck bill nozzles. Referring to FIG. 2, each air nozzle 12 directs a stream of air away from the target area, which in this case is light 16. Referring to FIG. 3, the deflector 18 deflects the air from air nozzles 12 such that it creates an air curtain 20 that covers the target area (the light 16) and prevents snow and dust from reaching the light 16. Drainage holes 22 located on the deflector 18 allow for the drainage of liquids away from the light 16 to prevent the freezing of the liquid on the light 16 or deflector 18.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method for preventing a build up of snow or dust on a cover for a vehicle tail light, comprising the steps of:
   providing a plurality of air nozzles that are open directly to atmosphere and a deflector positioned around a periphery of the vehicle tail light;
   preventing snow or dust from landing on the tail light by creating an air curtain that covers the vehicle tail light, the air curtain being created by directing a stream of air from each of the plurality of air nozzles such that the deflector deflects the streams of air to direct deflected streams of air across the vehicle tail light and toward the center of the vehicle tail light such that the deflected streams of air from the air nozzles converge and interfere to form the air curtain, and
   using the air nozzles to direct the stream of air away from the tail light prior to being deflected by the deflector, and the deflector being separated and distinct from the air nozzles.

2. The method of claim 1, wherein the step of providing a deflector comprises providing a transparent deflector in order to prevent the deflector from obscuring visibility of the light.

3. The method of claim 1, wherein the step of providing the plurality of air nozzles comprises providing a plurality of duck bill nozzles.

4. The method of claim 1, further comprising the step of providing the deflector with drainage holes to facilitate draining liquid away from the tail light.

5. The method of claim 1, further comprising the step of providing a dedicated air source that provides air solely to the air nozzles.

6. The method of claim 5, further comprising the step of powering the dedicated air source using a battery.

7. A method for preventing a build up of snow or dust on a cover for a vehicle tail light, comprising the steps of:
   providing a plurality of air nozzles that are open directly to atmosphere and a deflector positioned around a periphery of the vehicle tail light;
   connecting the air nozzles exclusively to an air source so only air is supplied to the air nozzles;
   preventing snow or dust from landing on the tail light by creating an air curtain that covers the vehicle tail light, the air curtain being created by directing a stream of air from each of the plurality of air nozzles such that the deflector deflects the streams of air from each air nozzle to direct deflected streams of air in a direction that crosses the vehicle tail light and is toward the center of the vehicle tail light such that the deflected streams of air from the air nozzles intersect and interfere to form the air curtain, and
   using the air nozzles to direct the stream of air away from the tail light prior to being deflected by the deflector, and the deflector being separated and distinct from the air nozzles.

* * * * *